Jan. 13, 1953     F. A. GAYNOR ET AL     2,625,662
SIGNAL DISCRIMINATOR
Filed Dec. 30, 1950

Inventors:
Frank A. Gaynor,
Charles G. Yates Jr.
by Claude H. Matt.
Their Attorney.

Patented Jan. 13, 1953

2,625,662

UNITED STATES PATENT OFFICE 2,625,662

SIGNAL DISCRIMINATOR

Frank A. Gaynor and Charles G. Yates, Jr., Schenectady, N. Y., assignors to General Electric Company, a corporation of New York Application December 30, 1950, Serial No. 203,684

3 Claims. (Cl. 307—107)

This invention relates to discriminators and more particularly to means for discriminating against signals which are out of phase with respect to a reference voltage.

There are many applications such as in servo amplifier circuits where it is necessary to isolate the ideal controlling signal from unwanted extraneous signals which are bound to be present in complicated circuits. Conventional discriminators employ vacuum tubes in push-pull in an arrangement in which amplification of in-phase signals is greater than that for quadrature signals. However, in signal circuits employing a number of signal sources connected together in series or parallel such as selsyns, potentiometers, and tachometers, it is very difficult to eliminate out-of-phase signals. It is not unusual to find the ratio of unwanted to desired signal as high as 10 or 20 to 1. Although the signal sources may be phased out for a given frequency, the number of components may be prohibitive and the phasing over the rest of the operating frequency range may be poor.

It is accordingly an object of our invention to provide simple and accurate means for discriminating against undesired signals such as out-of-phase signals, thyratron hash and harmonic distortion.

According to our invention, switch means are provided for briefly sampling the input signals to be filtered so as to produce a direct current output which is proportional to the in-phase signal only, then feeding the direct current signal into a chopper circuit whose output is a square wave in phase with the line voltage and whose amplitude is proportional to the inphase component of the total input signal. If desired, the square wave input may then be amplified in a conventional alternating current amplifier.

The invention will be more fully understood by referring now to the accompanying drawings wherein.

Figure 1:
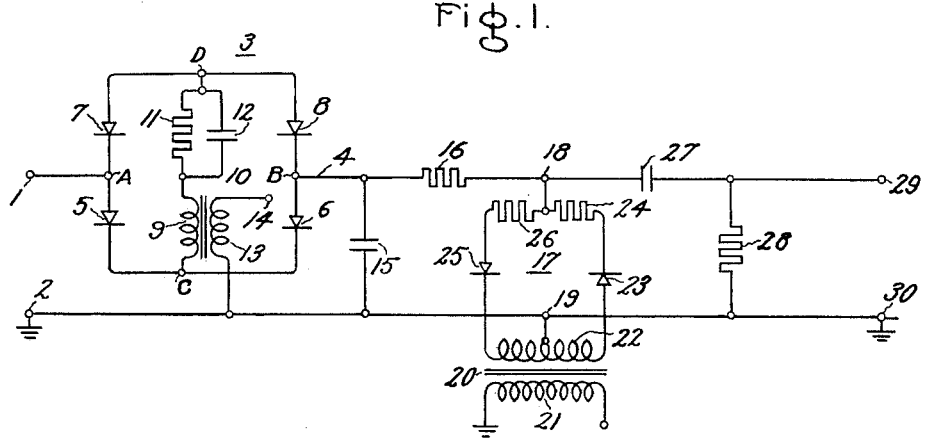
Fig. 1 is a diagrammatic representation of our discriminator circuit.

Referring now to Fig. 1, the signals to be filtered are applied to the input conductors 1 and 2 of an electronic type switch 3, which functions to pass a selected portion of the input signal to output conductors 4 and 2. The electronic switch 3 comprises two pairs of oppositely disposed unidirectional devices between the points A and B. These devices may be diodes, or as shown, simple rectifiers of the copper oxide type. The first pair of unidirectional devices comprises the rectifiers 5 and 6 which have a mid-tap C, and the second pair comprises rectifiers 7 and 8 having a mid-tap D. The points C and D are connected together via the secondary winding 9 of a transformer 10, the secondary 9 being connected in series to the point D with the parallel combination of resistor 11 and capacitor 12. The transformer 10 has a primary winding 13 which is energized by a source of alternating voltage applied, hereinafter referred to as the line voltage between the terminal 14 and ground. It will be noted that the four rectifiers are all arranged to pass current in the same direction with respect to the source of applied voltage between the points C and D.

In operation, the switch 3 will in effect connect the input signal which appears at point A to the point B for a limited time during each cycle of the line voltage wave, as will be hereinafter explained. The duration of the conduction period will be determined by the RC network which is in series with the secondary winding 9. The time at which conduction occurs is, of course, at or near the peak of the line voltage. With a large RC time constant, the conducting period will be short.

The output of the electronic switch will charge a capacitor 15 up to a direct current potential approximately equal to the peak value of the input signal, provided of course that this signal is in phase, or 180° out of phase, with the line voltage.

The output of capacitor 15 is connected through a resistor 16 to a chopper circuit 17 connected across the terminals 18 and 19. The chopper circuit 17 includes a transformer 20 having a primary winding 21 connected to the source of alternating reference voltage. The secondary winding 22 has a mid-tap connected to terminal 19 and one extremity of secondary 22 is connected in series with rectifier 23 and resistor 24 to the terminal 18. Similarly, the other extremity of secondary 22 is connected to a rectifier 25 which is in series with a resistor 26 also connected to the terminal 18. The rectifiers 23 and 25 are disposed to pass current in the same direction through the secondary winding 22 of transformer 20. The purpose of chopper circuit 17 is to generate a square wave in phase with the line voltage, the amplitude of which wave is proportional to the inphase component of the total input signal. The output of the chopper circuit is passed through a capacitor 27 which is in series with a load resistor 28 connected across the output terminals 29 and 30.

Figure 2:
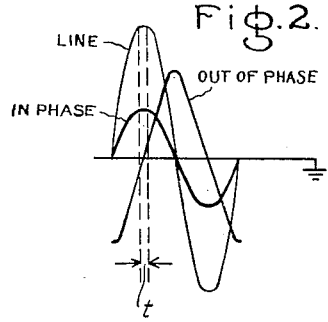
Figs. 2, 3 and 4 are wave forms for explaining the operation of our circuit.
Figures 3, 4:

With the foregoing understanding of the elements and their organization, the operation of our invention will be readily understood from the following explanation when considered in connection with the waveforms shown in Figs. 2, 3 and 4.

Looking now at Fig. 2 there is shown the relationship among several voltage wave forms related to the operation of the electronic switch 3. It will be noted that the input signal includes a desirable in-phase signal and an unwanted out of phase or quadrature signal which is displaced by 90°. The alternating line voltage applied to transformers 10 and 20 is taken from the same source and serves as a common reference voltage, and for this application, may be considered to be in the nature of a switching voltage. As the switching voltage on the secondary winding 9 increases to its positive peak value, current will flow through the resistor 11 to point D and through both paths of rectifiers back to the point C. Voltage across the resistor 11 will cause the capacitor 12 to become charged and since the rectifiers have negligible resistance in the current passing direction, the capacitor 12 will be charged to the full voltage across resistor 11 which voltage is substantially equal to that across the secondary winding 9.

As the voltage at winding 9 decreases from its positive peak, the capacitor 12 will retain its charge which is negative on the side connected to point D. The value of resistance 11 and the capacitance is kept high so that the time constant RC is much greater than the time of one cycle of the source voltage.

Since the net sum of the voltage from C to D is negative (voltage across capacitor is negative and greater than across transformer winding 9) there will be no current flow through the rectifiers. The voltage across 9 decreases to zero and increases negatively, decreases to zero, and starts to rise positively. During this time the capacitor 12 has discharged slightly so that finally toward the positive peak of voltage across winding 9, the net voltage from C to D will be positive and the rectifiers will conduct for a short period. This action recurs at each cycle of the line voltage.

When current is flowing thru rectifiers 7 and 5, and 8 and 6, a low impedance path exists between points A and B and the points in effect are connected together. When there is no current flowing thru the rectifiers, a very high impedance exists between points A and B as compared to the impedance across the input circuit at points 1 and 2, or the impedance across capacitor 15, so that all the signal voltage drop appears across A and B and none of it across 15. This is true regardless of whether the signal is instantaneously positive or negative.

From the above explanation it can be seen that current will flow thru 7 and 5, and 8 and 6 only for a very limited time during the positive peak of the line voltage, and during this time signal current may flow to charge up capacitor 15 to whatever the peak in phase value of signal voltage exists at the moment. The capacitor 15 may charge either negatively or positively depending on the polarity of the signal.

Thus it will be seen that the positive peak of the in-phase signal is sampled once in every cycle and appears as a direct voltage across the capacitor 15 as illustrated by Fig. 3. Any quadrature voltage which appears during the conduction period "t" would tend to increase the amount of voltage impressed across capacitor 15 but it will be noted that the amplitude of the quadrature voltage during this brief period is negligible compared with the desired in-phase signal.

The direct voltage across capacitor 15, after passing through a dropping resistor 16 which is large as compared to resistors 24 and 26, is then passed through the chopper circuit 17 where it is converted to a square wave proportional to the in-phase or ideal component of the total input circuit. Briefly, the chopper circuit operates such that when the alternating voltage applied to transformer 20 is of a positive polarity on the right side of secondary 22 (looking at the drawing), the rectifiers 23 and 25 permit current to flow freely in a counterclockwise direction, and therefore a low impedance path will exist between the terminals 18 and 19. When this polarity reverses, the rectifiers 23 and 25 will offer a high impedance, and substantially no current will flow in the chopper circuit in a clockwise direction. Accordingly, under the latter condition, the chopper circuit comprises a relatively high impedance connected between terminals 18 and 19. It will therefore be seen from the foregoing explanation that a chopping action takes place so that, for one half cycle, substantially no voltage is produced across the terminals 18, 19 whereas for the alternate half cycle, substantially full voltage is produced across these terminals.

The purpose of capacitor 27 is to block the direct current portion of the voltage that could come from capacitor 15 so that if the output at terminals 29 and 30 is fed to the grid of a tube, there will be no unwanted DC biasing of the tube.

The resistance 28 merely serves as a load resistor. The output of our discriminator may be taken from terminals 29 and 30 and will appear as a square wave as shown in Fig. 4. It will of course be understood that where desirable, this alternating voltage output may be amplified by means well known in the art.

While a particular embodiment of our invention has been illustrated and described, modifications thereof will readily occur to those skilled in the art. It should also be understood therefore that the invention is not limited to the particular arrangement disclosed, but that the appended claims are intended to cover all modifications which do not depart from the true spirit and scope of the invention.

What we claim as new and desire to secure by Letters Patent of the United States is:

1. An electric circuit for discriminating against undesired signals from a source of signal voltage having components which are in phase and components which are out of phase with an alternating reference voltage, said circuit comprising, in combination, a capacitor, a rectifier-bridge type of electric switch for connecting said capacitor to said source for a limited time during the peak of said alternating reference voltage whereby to cause a direct voltage substantially proportional to said source to be applied to said capacitor, and a chopper circuit for connecting said proportional direct voltage to an alternating voltage in phase with said alternating reference voltage.

2. An electric circuit for discriminating against undesired signals from a source of input signal voltage having components which are in phase and components which are out of phase with an alternating reference voltage, said circuit comprising a capacitor, rectifier-bridge switch means for charging said capacitor with pulses of voltage substantially proportional to the peak value of said input signal voltage in order to produce a direct voltage proportional to said peak value of the input, and means for converting said direct voltage to an alternating voltage in phase with said alternating reference voltage.

3. A circuit for discriminating against quadrature signal voltages comprising the series combination of a capacitor with the source of total input signal voltage, said combination being connected across one diagonal of a rectifier bridge which has connected across its other diagonal the series combination of an RC network and a source of alternating reference voltage, and means connected to the output of said capacitor for converting its direct voltage to an alternating voltage which is in phase with said reference voltage, said RC network having a time constant which allow the rectifier bridge to conduct for a limited time only during the peak of said alternating reference voltage.

FRANK A. GAYNOR.
CHARLES G. YATES, Jr.

REFERENCES CITED

The following references are of record in the file of this patent:

UNITED STATES PATENTS

| Number | Name | Date |
|---|---|---|
| 2,398,421 | Frische | Apr. 16, 1946 |
| 2,399,695 | Satterlee | May 7, 1946 |